United States Patent
Sawai et al.

(10) Patent No.: US 7,516,925 B2
(45) Date of Patent: Apr. 14, 2009

(54) DISPLAY SUPPORT MECHANISM

(75) Inventors: Kunio Sawai, Daito (JP); Katsuyuki Yokota, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 89 days.

(21) Appl. No.: 11/681,362

(22) Filed: Mar. 2, 2007

(65) Prior Publication Data

US 2007/0210220 A1  Sep. 13, 2007

(30) Foreign Application Priority Data

Mar. 3, 2006  (JP)  ............................. 2006-057499

(51) Int. Cl.
*A47G 23/02* (2006.01)

(52) U.S. Cl. ..................... 248/146; 248/917; 248/919; 345/520

(58) Field of Classification Search ............... 248/146, 248/158, 291.1, 292.14, 284.1, 917, 919, 248/920, 921, 922, 923; 361/682; 345/520
See application file for complete search history.

(56) References Cited

U.S. PATENT DOCUMENTS 6,550,725 B1 * 4/2003 Watson ....................... 248/146

6,581,893 B1 * 6/2003 Lu ........................... 248/291.1
6,769,657 B1 * 8/2004 Huang ...................... 248/278.1
2003/0122046 A1 * 7/2003 Huong ...................... 248/291.1

FOREIGN PATENT DOCUMENTS

| JP | 8-74834 A | 3/1996 |
|---|---|---|
| JP | 10-280781 A | 10/1996 |
| JP | 11-338363 A | 12/1999 |
| JP | 3086465 U | 3/2002 |
| JP | 2003-156029 A | 5/2003 |
| JP | 3106183 U | 10/2004 |

* cited by examiner

*Primary Examiner*—Ramon O Ramirez
(74) *Attorney, Agent, or Firm*—Crowell & Moring LLP

(57) ABSTRACT

A display support mechanism allowing an easy operation of controlling the angle of a display screen with no requirement for a round shaft serving as an axis of rotation is obtained. This display support mechanism comprises a support shaft provided in the form of a plate, a display screen support member, having a first hole receiving the platelike support shaft, rotatable about the support shaft serving as an axis of rotation and a base support member having a second hole receiving the platelike support shaft, while at least either the display screen support member or the base support member is provided with a projecting portion brought into pressure contact with opposed surfaces of the display screen support member and the base support member for developing frictional resistance.

15 Claims, 12 Drawing Sheets

DISPLAY SUPPORT MECHANISM

BACKGROUND OF THE INVENTION

1. Field of the Invention

The present invention relates to a display support mechanism.

2. Description of the Background Art

A display support mechanism capable of supporting a display screen in a state inclined by a prescribed angle is known in general, as disclosed in Japanese Utility Model Registration No. 3086465, for example.

The display support mechanism described in Japanese Utility Model Registration No. 3086465 supports the display screen with a pair of support legs, whose angle is varied for controlling the angle of the display screen. The pair of support legs are fixed by pins, for fixing the angle of the display screen.

In the display support mechanism described in the aforementioned Japanese Utility Model Registration No. 3086465, however, the pins fixing the support legs must be loosened in order to control the angle of the display screen, and thereafter refastened for refixing the support legs. Thus, the operation of controlling the angle of the display screen is disadvantageously complicated.

In order to solve this problem, there is proposed a display support mechanism provided with a rotary shaft for rotating a display screen while applying frictional force in the rotational direction for inhibiting the display screen from rotation resulting from its own weight. For example, each of Japanese Patent Laying-Open Nos. 8-74834 (1996), 2003-156029 and 11-338363 (1999), Japanese Utility Model Registration No. 3106183 and Japanese Patent Laying-Open No. 10-280781 (1998) discloses such a display support mechanism.

In the display support mechanism proposed in each of the aforementioned patent documents such as Japanese Patent Laying-Open No. 8-74834, a round shaft is employed for serving as an axis of rotation for rotating the display screen with respect to a base for supporting the display screen. The user rotates the display screen by applying force larger than the frictional force for inhibiting the same from rotation resulting from its own weight in the rotational direction. When the user releases the display screen in an inclined state, the display screen is kept at the angle of inclination due to the frictional force.

In the structure employing the round shaft serving as the axis of rotation for inclining the display screen by a prescribed angle as proposed in each of the aforementioned patent documents such as Japanese Patent Laying-Open No. 8-74834, however, grooving or the like must be performed along the outer periphery of the round shaft for mounting a stop member such as a C-ring in order to prevent the round shaft from axial deviation, to disadvantageously result in complicated working of the axis of rotation.

SUMMARY OF THE INVENTION

The present invention has been proposed in order to solve the aforementioned problems, and an object of the present invention is to provide a display support mechanism allowing an easy operation of controlling the angle of a display screen with no requirement for a round shaft serving as an axis of rotation.

A display support mechanism according to a first aspect of the present invention comprises a support shaft provided in the form of a plate, a display screen support member, having a first hole receiving the platelike support shaft, provided on the side of a display screen and rotatable about the support shaft serving as an axis of rotation and a base support member, having a second hole receiving the platelike support shaft, provided on the side of a base, while at least either the display screen support member or the base support member is provided with a projecting portion brought into pressure contact with opposed surfaces of the display screen support member and the base support member for developing frictional resistance.

As hereinabove described, the display support mechanism according to the first aspect of the present invention is provided with the platelike support shaft as well as the display screen support member, having the first hole receiving the platelike support shaft, rotatable about the support shaft serving as the axis of rotation and the base support member having the second hole receiving the platelike support shaft, so that the platelike support shaft can be employed as the axis of rotation with no requirement for a round shaft. Further, the display support mechanism provided with the projecting portion brought into pressure contact with the opposed surfaces of the display screen support member and the base support member for developing frictional resistance can develop frictional force between the display screen support member and the base support member for inhibiting the display screen support member from rotation with respect to the base support member. With this frictional force, the display support mechanism can inhibit the display screen support member from rotating with respect to the base support member by its own weight. Therefore, the display screen support member may not be fixed to a prescribed inclinatory position with respect to the base support member through pins or the like, whereby the angle of the display screen can be easily controlled.

In the aforementioned display support mechanism according to the first aspect, the projecting portion provided on at least either the display screen support member or the base support member is preferably brought into pressure contact with at least either the base support member or the display screen support member while at least either the display screen support member or the base support member is deflected by elastic deformation. According to this structure, the display screen support member or the base support member can bring the projecting portion into pressure contact with the base support member or the display screen support member with prescribed pressing force, whereby the frictional force for inhibiting the display screen support member from rotation can be easily obtained. Therefore, the frictional force for inhibiting the display screen support member from rotation can be obtained without providing another member such as a plate spring.

In the aforementioned display support mechanism according to the first aspect, the projecting portion preferably includes a first projecting portion provided on the display screen support member and a second projecting portion provided on the base support member, and the first projecting portion of the display screen support member and the second projecting portion of the base support member are preferably so arranged as to hold the support shaft therebetween. According to this structure, frictional force can be applied to positions opposite to each other with respect to the support shaft serving as the axis of rotation, whereby the frictional force as well as the operation of rotating the display screen support member can be stabilized.

In the aforementioned display support mechanism according to the first aspect, at least either the first hole or the second hole receiving the platelike support shaft is preferably provided in the form of a sector while the display screen support member is preferably rotatable about the platelike support shaft serving as an axis of rotation in the angular range of the sector. According to this structure, the rotatable angular range of the display screen support member can be regulated through the sectoral first or second hole without providing another member for regulating the range of rotation.

In the aforementioned display support mechanism according to the first aspect, either the first hole or the second hole is preferably provided in the form of a sector while either the second hole or the first hole is preferably provided in the form of a rectangle for regulating rotation of the platelike support shaft. According to this structure, the platelike support shaft remains unsliding with respect to the display screen support member when the first hole thereof is provided in the form of a rectangle and remains unsliding with respect to the base support member when the second hole thereof is provided in the form of a rectangle, whereby the display screen support member or the base support member can be inhibited from abrasion resulting from sliding of the support shaft.

In the aforementioned structure having the first projecting portion of the display screen support member and the second projecting portion of the base support member arranged to hold the support shaft therebetween, the first projecting portion is preferably provided in the vicinity of the lower end of the display screen support member, and the second projecting portion is preferably provided in the vicinity of the upper end of the base support member. According to this structure, the distances between the first and second projecting portions applying friction and the support shaft serving as the axis of rotation can be increased. Thus, torque obtained by the first and second projecting portions for inhibiting the display screen support member from rotating about the support shaft can be increased.

In the aforementioned display support mechanism according to the first aspect, the projecting portion and at least either the display screen support member or the base member against which the projecting portion is pressed are preferably brought into pressure contact with each other through grease. According to this structure, the grease can inhibit the projecting portion and at least either the display screen support member or the base support member against which the projecting portion is pressed from abrasion resulting from friction.

In the aforementioned display support mechanism according to the first aspect, the support shaft is preferably made of sheet metal. According to this structure, the support shaft of sheet metal provided in the form of a plate is so easily borable or shapable by press working that no complicated working of the axis of rotation is required dissimilarly to a case of performing grooving or the like along the outer peripheral surface of a round shaft.

A display support mechanism according to a second aspect of the present invention comprises a support shaft of sheet metal provided in the form of a plate, a display screen support member, having a first hole receiving the platelike support shaft, provided on the side of a display screen and rotatable about the support shaft serving as an axis of rotation, a base support member, having a second hole receiving the platelike support shaft, provided on the side of a base and a plate member having a third hole receiving the platelike support shaft, while the plate member is provided with a projecting portion brought into pressure contact with at least either the display screen support member or the base support member for developing frictional resistance.

As hereinabove described, the display support mechanism according to the second aspect of the present invention is provided with the platelike support shaft as well as the display screen support member, having the first hole receiving the platelike support shaft, rotatable about the support shaft serving as the axis of rotation and the base support member having the second hole receiving the platelike support shaft, so that the platelike support shaft can be employed as the axis of rotation with no requirement for a round shaft. In this case, the support shaft of sheet metal provided in the form of a plate is so easily borable or shapable by press working that no complicated working of the axis of rotation is required dissimilarly to a case of performing grooving or the like along the outer peripheral surface of a round shaft. Further, the plate member receiving the platelike support shaft, provided with the projecting portion brought into pressure contact with either the display screen support member or the base support member for developing frictional resistance, can develop frictional force between the projecting portion of the plate member and the display screen support member or the base support member for inhibiting the display screen support member from rotation with respect to the base support member. With this frictional force, the display support mechanism can inhibit the display screen support member from rotating with respect to the base support member by its own weight. Therefore, the display screen support member may not be fixed to a prescribed inclinatory position with respect to the base support member through pins or the like, whereby the angle of the display screen can be easily controlled.

In the aforementioned display support mechanism according to the second aspect, the projecting portion of the plate member preferably includes a pair of projecting portions so arranged as to hold the support shaft therebetween. According to this structure, frictional force can be applied to positions opposite to each other with respect to the support shaft serving as the axis of rotation, whereby the frictional force as well as the operation of rotating the display screen support member can be stabilized.

In the aforementioned display support mechanism according to the second aspect, at least either the first hole or the second hole receiving the platelike support shaft is preferably provided in the form of a sector while the display screen support member is rotatable about the platelike support shaft serving as an axis of rotation in the angular range of the sector. According to this structure, the rotatable angular range of the display screen support member can be regulated through the sectoral first or second hole without providing another member for regulating the range of rotation.

In the aforementioned display support mechanism according to the second aspect, either the first hole or the second hole is preferably provided in the form of a sector while either the second hole or the first hole is preferably provided in the form of a rectangle for regulating rotation of the platelike support shaft. According to this structure, the platelike support shaft remains unsliding with respect to the display screen support member when the first hole thereof is provided in the form of a rectangle and remains unsliding with respect to the base support member when the second hole thereof is provided in the form of a rectangle, whereby the display screen support member or the base support member can be inhibited from abrasion resulting from sliding of the support shaft.

A display support mechanism according to a third aspect of the present invention comprises a display screen support member provided on the side of a display screen, a base support member provided on the side of a base and a support shaft provided in the form of a plate, the display screen support member has a first hole receiving the platelike support shaft and is rotatable about the support shaft serving as an axis of rotation, the base support member has a second hole receiving the platelike support shaft, the display screen support member and the base support member are provided with a first projecting portion and a second projecting portion brought into pressure contact with opposed surfaces of the base support member and the display screen support member respectively for developing frictional resistance, the first projecting portion and the second projecting portion are so arranged as to hold the support shaft therebetween, the first projecting portion of the display screen support member and the second projecting portion of the base support member are brought into pressure contact with the base support member and the display screen support member respectively while the display screen support member and the base support member are deflected by elastic deformation, either the first hole or the second hole is provided in the form of a sector while either the second hole or the first hole is provided in the form of a rectangle for regulating rotation of the platelike support shaft, and the display screen support member is rotatable about the platelike support shaft serving as an axis of rotation in the angular range of the sector.

As hereinabove described, the display support mechanism according to the third aspect of the present invention is provided with the platelike support shaft as well as the display screen support member, having the first hole receiving the platelike support shaft, rotatable about the support shaft serving as the axis of rotation and the base support member having the second hole receiving the platelike support shaft, so that the platelike support shaft can be employed as the axis of rotation with no requirement for a round shaft. Further, the display support mechanism provided with the projecting portions brought into pressure contact with the opposed surfaces of the display screen support member and the base support member for developing frictional resistance can develop frictional force between the display screen support member and the base support member for inhibiting the display screen support member from rotation with respect to the base support member. With this frictional force, the display support mechanism can inhibit the display screen support member from rotating with respect to the base support member by its own weight. Therefore, the display screen support member may not be fixed to a prescribed inclinatory position with respect to the base support member through pins or the like, whereby the angle of the display screen can be easily controlled.

Further, the first projecting portion of the display screen support member and the second projecting portion of the base support member are brought into pressure contact with the base support member and the display screen support member respectively while the display screen support member and the base support member are deflected by elastic deformation so that the first and second projecting portions can be brought into pressure contact with the base support member and the display screen support member with prescribed pressing force, whereby the frictional force for inhibiting the display screen support member from rotation can be easily obtained. Therefore, the frictional force for inhibiting the display screen support member from rotation can be obtained without providing another member such as a plate spring. In addition, the first and second projecting portions provided on the display screen support member and the base support member respectively are so arranged as to hold the support shaft therebetween so that frictional force can be applied to positions opposite to each other with respect to the support shaft serving as the axis of rotation, whereby the frictional force as well as the operation of rotating the display screen support member can be stabilized.

Further, either the first hole or the second hole receiving the platelike support shaft is provided in the form of a sector while the display screen support member is rotatable about the platelike support shaft serving as the axis of rotation in the angular range of the sector, whereby the rotatable angular range of the display screen support member can be regulated through the sectoral first or second hole without providing another member for regulating the range of rotation. In addition, either the first hole or the second hole is provided in the form of a sector while either the second hole or the first hole is provided in the form of a rectangle for regulating rotation of the platelike support shaft, whereby the platelike support shaft remains unsliding with respect to the display screen support member when the first hole thereof is provided in the form of a rectangle and remains unsliding with respect to the base support member when the second hole thereof is provided in the form of a rectangle, whereby the display screen support member or the base support member can be inhibited from abrasion resulting from sliding of the support shaft.

In the aforementioned display support mechanism according to the third aspect, the first projecting portion is preferably provided in the vicinity of the lower end of the display screen support member, and the second projecting portion is preferably provided in the vicinity of the upper end of the base support member. According to this structure, the distances between the first and second projecting portions applying friction and the support shaft serving as the axis of rotation can be increased. Thus, torque obtained by the first and second projecting portions for inhibiting the display screen support member from rotating about the support shaft can be increased.

In the aforementioned display support mechanism according to the third aspect, the projecting portions and at least either the display screen support member or the base member against which the projecting portions are pressed are preferably brought into pressure contact with each other through grease. According to this structure, the grease can inhibit the projecting portions and at least either the display screen support member or the base support member against which the projecting portions are pressed from abrasion resulting from friction.

In the aforementioned display support mechanism according to the third aspect, the support shaft is preferably made of sheet metal. According to this structure, the support shaft of sheet metal provided in the form of a plate is so easily borable or shapable by press working that no complicated working of the axis of rotation is required dissimilarly to a case of performing grooving or the like along the outer peripheral surface of a round shaft.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

First, the structure of a display support mechanism 1 according to a first embodiment of the present invention is described with reference to FIGS. 1 to 10.

Figure 1:
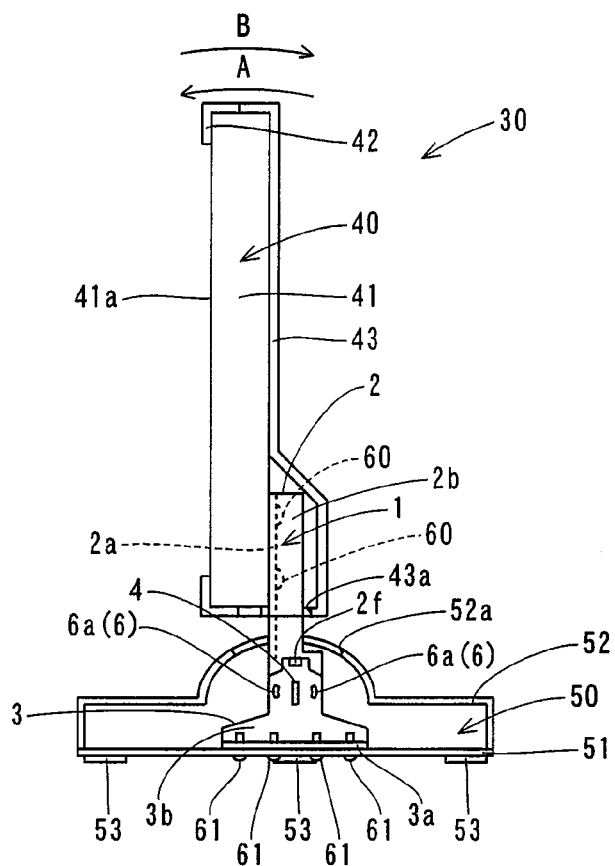
FIG. 1 is a side elevational view showing the overall structure of a liquid crystal display provided with a display support mechanism according to a first embodiment of the present invention.
Figure 2:
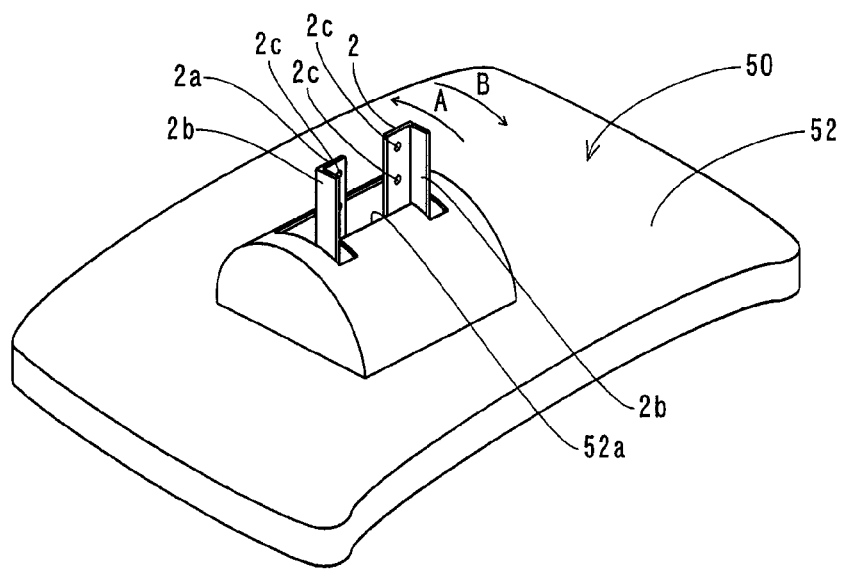
FIG. 2 is a perspective view of the display support mechanism according to the first embodiment shown in FIG. 1, from which a liquid crystal display portion is removed.

The display support mechanism 1 according to the first embodiment of the present invention is provided for supporting a liquid crystal display portion 40 of a liquid crystal display 30, as shown in FIG. 1. This display support mechanism 1 is mounted on a base 50. The display support mechanism 1 supports the liquid crystal display portion 40 to be rotatable in directions A and B with respect to the base 50, as shown in FIGS. 1 and 2. The display support mechanism 1 is enabled to support the liquid crystal display portion 40 in a state inclined by a prescribed angle with respect to the base 50. The liquid crystal display portion 40 is an example of the "display screen" in the present invention.

Figure 3:
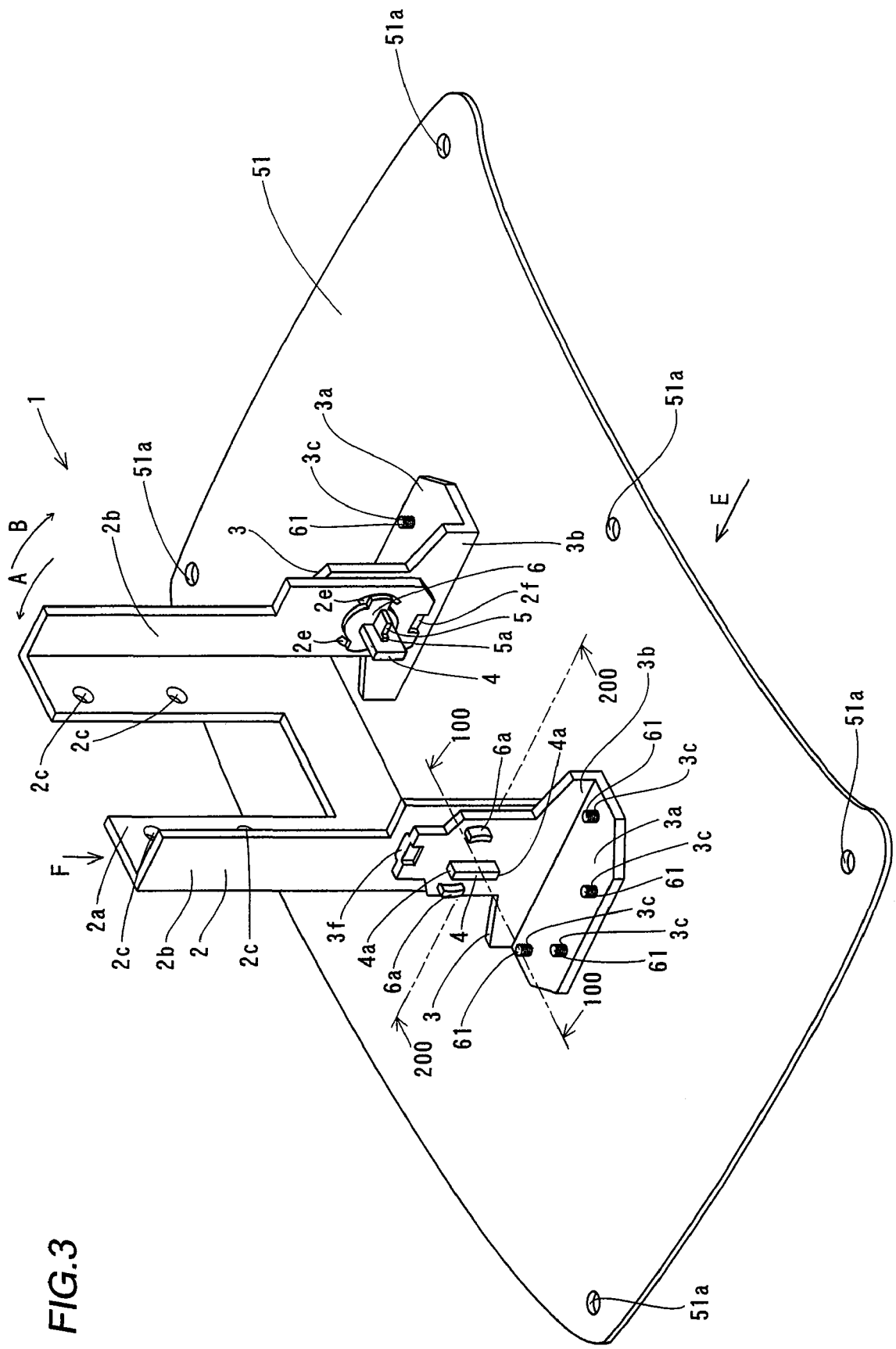
FIG. 3 is a perspective view showing the overall structure of the display support mechanism according to the first embodiment shown in FIG. 1.
Figure 4:
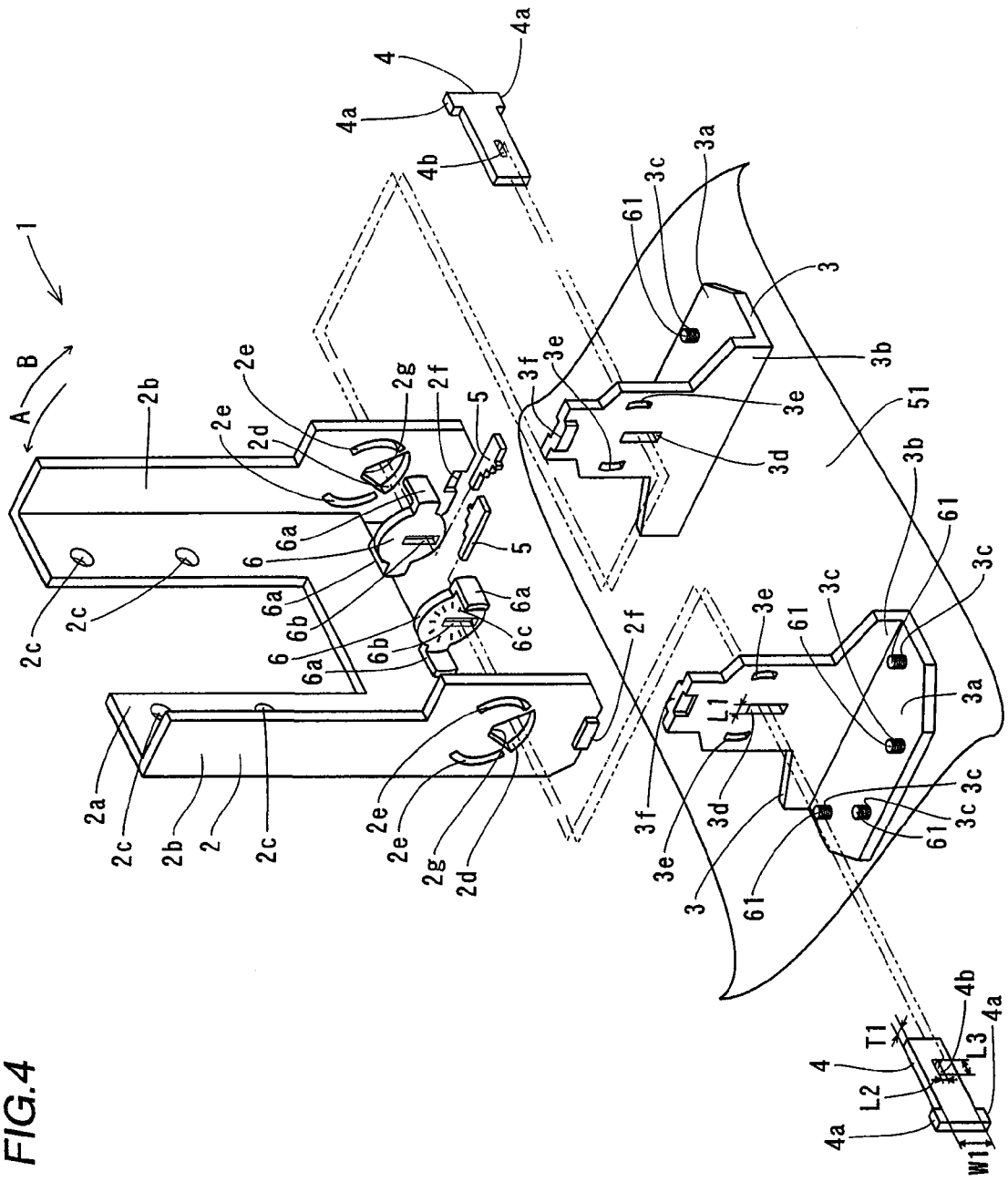
FIG. 4 is an exploded perspective view showing the overall structure of the display support mechanism according to the first embodiment shown in FIG. 3.

As shown in FIGS. 3 and 4, the display support mechanism 1 comprises a liquid crystal display portion support member 2 of sheet metal, a pair of base support members 3 of sheet metal, platelike support shafts 4 of sheet metal, stop members 5 of sheet metal and pressure-contact plates 6 of sheet metal.

According to the first embodiment, the liquid crystal display portion support member 2 includes a display mounting portion 2a and a pair of rotational portions 2b, as shown in FIGS. 3 and 4. The display mounting portion 2a of the liquid crystal display portion support member 2 is provided with four screw receiving holes 2c. The pair of rotational portions 2b of the liquid crystal display portion support member 2 are so provided as to extend from both side ends of the display mounting portion 2a perpendicularly to the surface thereof respectively. As shown in FIG. 4, the pair of rotational portions 2b have sectoral holes 2d, pairs of arcuate holes 2e and projecting portions 2f provided in the vicinity of the lower ends to protrude toward the base support member 3 respectively. The liquid crystal display portion support member 2 is an example of the "display screen support member" in the present invention. The holes 2d are examples of the "first hole" in the present invention. The projecting portions 2f are examples of the "first projecting portion" in the present invention.

Figure 8:
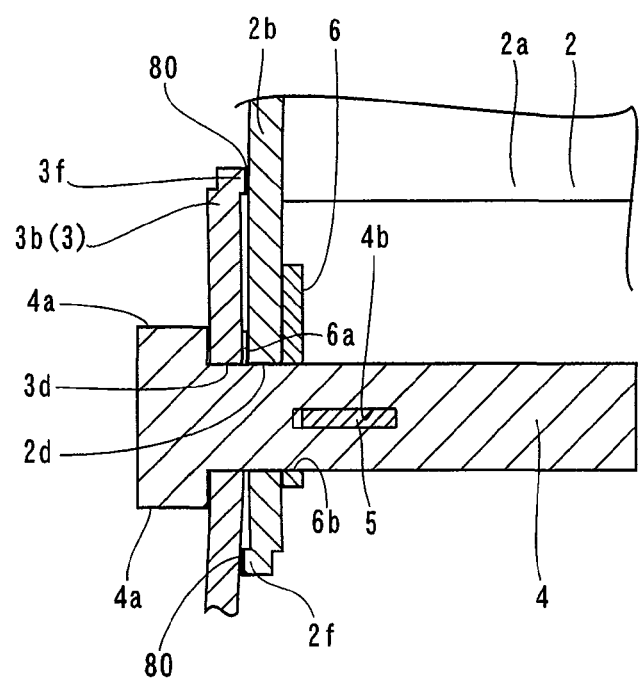
FIG. 8 is a sectional view taken along the line 100-100 in FIG. 3.
Figure 10:
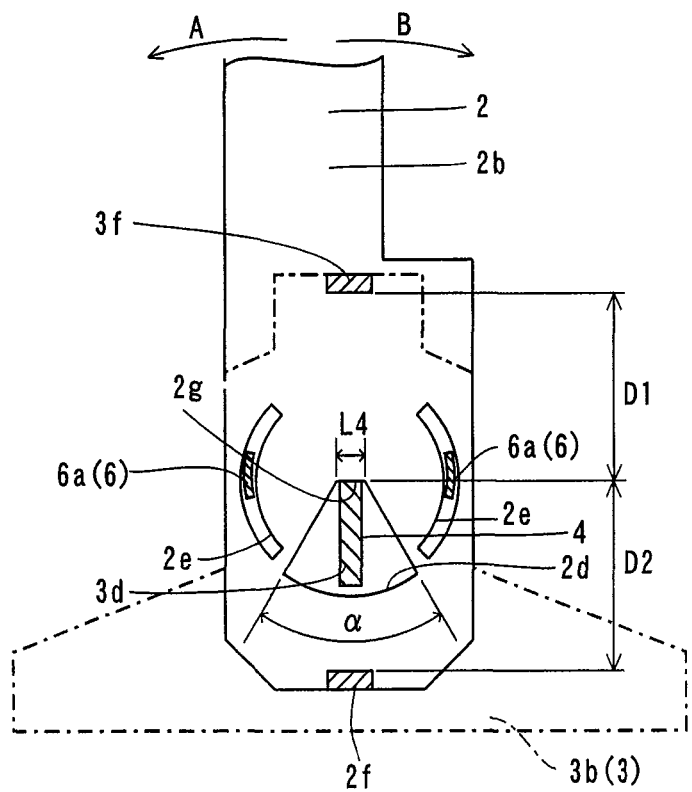
FIG. 10 is a sectional view taken along the line 200-200 in FIG. 3.

The sectoral holes 2d are provided for receiving the platelike support shafts 4, as shown in FIGS. 4 and 8. Each sectoral hole 2d has a central angle α of about 60° and is so arranged as to locate a bottom portion 2g thereof upward, as shown in FIG. 10. The length L4 of the bottom portions 2g of the sectoral holes 2d is substantially identical to the thickness T1 (see FIG. 4) of the support shafts 4, as described later. Thus, the bottom portions 2g of the sectoral holes 2d receive the vertical load of the liquid crystal display portion 40 through the liquid crystal display portion support member 2. The liquid crystal display portion support member 2 is rendered rotatable about the bottom portions 2g of the sectoral holes 2d supported by the platelike support shafts 4 in a sectoral angular range (about 60° according to the first embodiment). In other words, the platelike support shafts 4 function as the axes of rotation of the liquid crystal display portion support member 2.

Each pair of arcuate holes 2e are provided for receiving a pair of engaging sections 6a of the corresponding pressure-contact plate 8 as described later, as shown in FIG. 10. The pair of arcuate holes 2e are arranged on a circle around the bottom portion 2g of the sectoral hole 2d.

According to the first embodiment, the pair of base support members 3 include base mounting portions 3a and rotational portion mounting portions 3b respectively, as shown in FIGS. 3 and 4. Four screw mounting holes 3c are provided on the base mounting portion 3a of each base support member 3. The rotational portion mounting portions 3b of the base support members 3 are so provided as to vertically extend upward from first ends of the surfaces of the base mounting portions 3a. These rotational portion mounting portions 3b are provided with rectangular holes 3d, arcuate holes 3e smaller in arcuate length than the pairs of arcuate holes 2e of the display mounting portions 2b of the liquid crystal display portion support member 2 and projecting portions 3f provided in the vicinity of the upper ends to protrude toward the liquid crystal display portion support member 2. The holes 3d are examples of the "second hole" in the present invention. The projecting portions 3f are examples of the "second projecting portion" in the present invention.

The rectangular holes 3d are provided for receiving the platelike support shafts 4, as shown in FIGS. 4 and 8. The short-directional length L1 of the rectangular holes 3d is substantially identical to the thickness T1 (see FIG. 4) of the support shafts 4, as described later. Thus, the rectangular holes 3d have functions of regulating rotation of the support shafts 4. The pairs of arcuate holes 3e are provided for engaging with the engaging sections 6a of the pressure-contact plates 6, as described later. Further, the pairs of arcuate holes 3e are arranged on circles around the upper ends of the rectangular holes 3d respectively.

Figure 7:
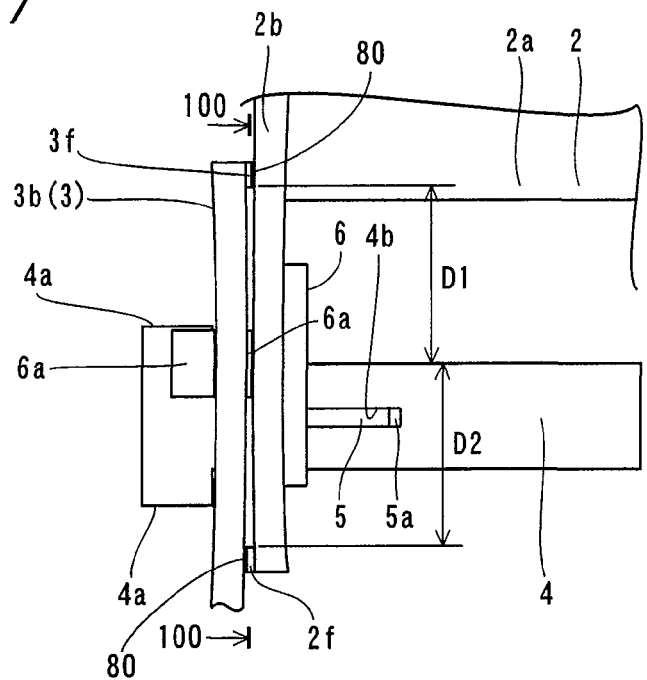
FIG. 7 partially illustrates the display support mechanism as viewed along arrow E in FIG. 3.
Figure 9:
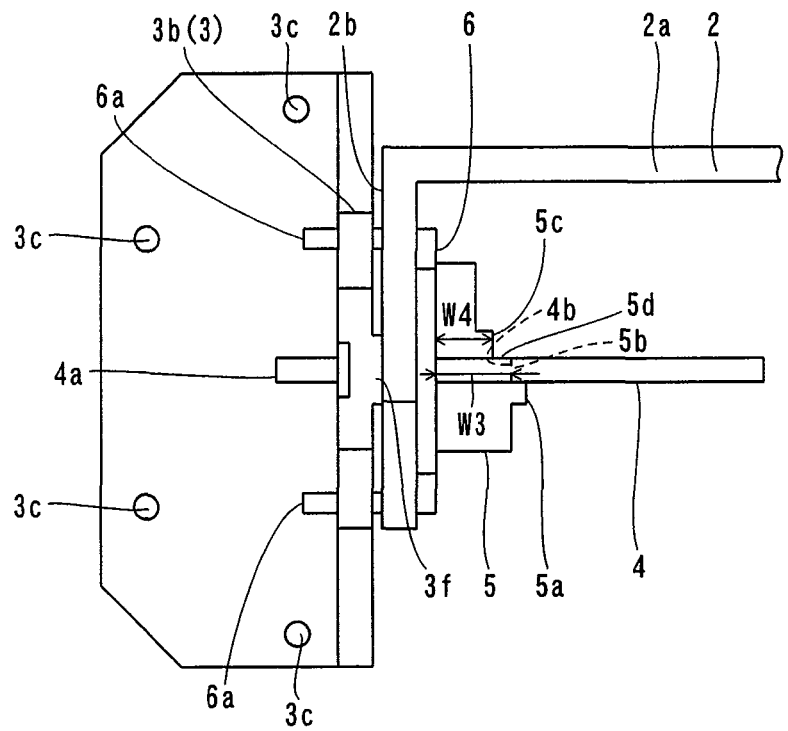
FIG. 9 partially illustrates the display support mechanism as viewed along arrow F in FIG. 3.

According to the first embodiment, the platelike support shafts 4 of sheet metal include pairs of contact portions 4a and rectangular holes 4b respectively, as shown in FIGS. 3 and 4. The pairs of contact portions 4a of the support shafts 4 are protrusively provided on rear ends of longitudinally extending side surfaces of the support shafts 4 respectively. Each contact portion 4a is provided for coming into contact with the corresponding base support member 3, as shown in FIGS. 7 and 8. The rectangular hole 4b of each support shaft 4 is provided for receiving the corresponding stop member 5, as shown in FIGS. 4 and 9. The short-directional length L2 (see FIG. 4) of the rectangular holes 4b is substantially identical to the thickness T2 (see FIG. 5) of the stop members 5, as described later. The holes 4b have a longitudinal length L3.

Figure 5:
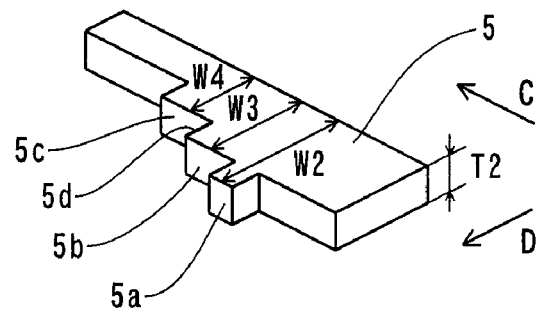
FIG. 5 is a perspective view showing a stop member of the display support mechanism according to the first embodiment shown in FIG. 3.

According to the first embodiment, each stop member 5 of sheet metal is provided in the form of a plate and includes a contact portion 5a and engaging portions 5b and 5c on a first side surface extending in the longitudinal direction, as shown in FIG. 5. The stop members 5 are provided for inhibiting the platelike support shafts 4 from coming off the sectoral holes 2d of the liquid crystal display portion support member 2 and the rectangular holes 3d of the base support member 3. The contact portion 5a of each stop member 5 is provided in a direction D (perpendicular to the thickness direction) perpendicular to an insertional direction C, as shown in FIG. 5. A portion of each stop member 5 corresponding to the contact portion 5a has a width W2 (see FIG. 5) larger than the longitudinal length L3 (see FIG. 4) of the holes 4b of the support shafts 4. This contact portion 5a is provided for coming into contact with the surface of the corresponding support shaft 4 thereby inhibiting the stop member 5 from coming off the hole 4b of the corresponding support shaft 4 when inserted into the hole 4b.

The rotational portions 2b of the liquid crystal display portion support member 2 and the rotational portion mounting portions 3b of the base support members 3 are held between and pressed by the stop members 5 and the contact portions 4a of the support shafts 4. Thus, the rotational portions 2b of the liquid crystal display support member 2 and the rotational portion mounting portions 3b of the base support members 3 are deflected in the range of elastic deformation to approach to each other, as shown in FIGS. 7 and 8. According to the first embodiment, the rotational portions 2b of the liquid crystal display portion support member 2 and the rotational portion mounting portions 3b of the base support members 3 are so deflected as to bring the projecting portions 2f and 3f into pressure contact with the rotational portion mounting portions 3b of the base support members 3 and the rotational portions 2b of the liquid crystal display portion support member 2 respectively through restoring force. Thus, frictional force is developed on the contact surfaces between the projecting portions 2f and the rotational portion mounting portions 3b of the base support members 3 and between the projecting portions 3f and the rotational portions 2b of the liquid crystal display portion support member 2 upon rotation of the liquid crystal display portion support member 2. The liquid crystal display portion support member 2 can be kept at an arbitrary angle of rotation due to this frictional force.

As shown in FIGS. 7 and 8, grease 80 is applied to the contact surfaces between each projecting portion 2f and the rotational portion mounting portion 3b of the corresponding base support member 3 and between each projecting portion 3f and the corresponding rotational portion 2b of the liquid crystal display portion support member 2. Thus, the rotational portions 2b of the liquid crystal display portion support member 2 of sheet metal and the rotational portion mounting portions 3b of the base support members 3 of sheet metal are inhibited from abrasion resulting from sliding upon rotation of the liquid crystal display portion support member 2.

The engaging portions 5b and 5c of each stop member 5 are enabled to receive pressing force resulting from deflection of the liquid crystal display portion support member 2 and the corresponding base support member 3 and to control pressing force for deflecting the liquid crystal display portion support member 2 and the corresponding base support member 3. More specifically, the engaging portion 5b of each stop member 5 is provided adjacently to the contact portion 5a, as shown in FIG. 5. The engaging portion 5c of the stop member 5 is adjacent to the engaging portion 5b through a step 5d. A portion of the stop member 5 corresponding to the engaging portion 5b has a width W3 smaller than the width W2 of the portion corresponding to the contact portion 5a as well as the longitudinal length L3 (see FIG. 4) of the hole 4b of the corresponding support shaft 4. A portion of the stop member 5 corresponding to the engaging portion 5c has a width W4 smaller than the width W3 of the portion corresponding to the engaging portion 5b as well as the longitudinal length L3 (see FIG. 4) of the hole 4b of the corresponding support shaft 4. When the engaging portion 5c is arranged in the hole 4b of the corresponding support shaft 4 as shown in FIG. 9, therefore, the stop member 5 and the contact portion 4a of the support shaft 4 are separated from each other by the length (=W3−W4) of the step 5d of the stop member 5 as compared with a case where the engaging portion 5b is arranged in the hole 4b of the corresponding support shaft 4. Thus, the pressing force for deflecting the liquid crystal display portion support member 2 and the base support members 3 can be reduced when the engaging portions 5c are arranged in the holes 4b of the support shafts 4, as compared with the case where the engaging portions 5b are arranged in the holes 4b of the support shafts 4. The liquid crystal display portion support member 2 and the base support members 3 are deflected with such pressing force that the liquid crystal display portion support member 2 is rotatable about the support shafts 4 serving as the axes of rotation and supportable at a prescribed angle of inclination with respect to the base support members 3.

As shown in FIG. 10, each projecting portion 2f of the liquid crystal display portion support member 2 and the projecting portion 3f of the corresponding base support member 3 are so arranged as to hold the corresponding support shaft 4 therebetween. Thus, frictional force can be applied to positions opposite to each other with respect to the support shaft 4 serving as the axis of rotation, whereby the frictional force as well as rotating operations can be stabilized. The distance D1 between each projecting portion 2f of the liquid crystal display portion support member 2 and the upper side (bottom portion 2g) of the corresponding support shaft 4 serving as the center of rotation and the distance D2 between the projecting portion 3f of the corresponding base support member 3 and the upper side (bottom portion 2g) of the corresponding support shaft 4 serving as the center of rotation are substantially equal to each other. Thus, the levels of the frictional force between each projecting portion 2f and the corresponding base support member 3 and between each projecting portion 3f and the liquid crystal display portion support member 2 can be approached to each other. Therefore, the rotating operations can be further stabilized.

Figure 6:
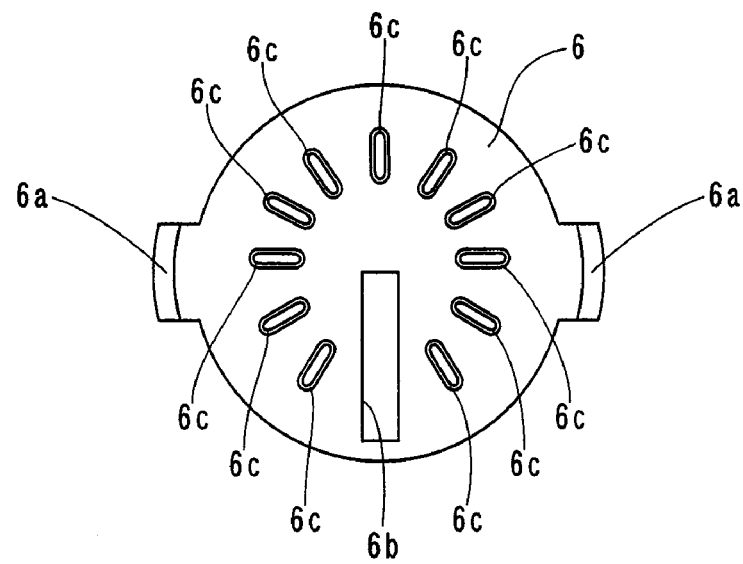
FIG. 6 is a plan view showing a pressure-contact plate of the display support mechanism according to the first embodiment shown in FIG. 3.

According to the first embodiment, the pressure-contact plates 6 of sheet metal are provided in the form of circles and include pairs of engaging sections 6a, rectangular holes 6b and a plurality of projecting portions 6c, as shown in FIGS. 3, 4 and 6. These pressure-contact plates 6 are arranged between the liquid crystal display portion support member 2 and the stop members 5, as shown in FIGS. 3 and 7. The pairs of engaging sections 6a of the pressure-contact plates 6 are so provided as to perpendicularly extend from ends of the surfaces of the pressure-contact plates 6. The rectangular holes 6b of the pressure-contact plates 6 are provided for receiving the support shafts 4, as shown in FIGS. 4, 7 and 8. The short-directional length of the rectangular holes 6b is substantially identical to the thickness T1 (see FIG. 4) of the support shafts 4, while the longitudinal length of the rectangular holes 6b is substantially identical to the width W1 (see FIG. 4) of the support shafts 4. The plurality of projecting portions 6c of the pressure-contact plates 6 are provided on the surfaces having the protruding engaging sections 6a for increasing the frictional force between the liquid crystal display portion support member 2 and the pressure-contact plates 6.

The liquid crystal display portion 40 includes a liquid crystal module 41 including a liquid crystal screen 41a, a front cabinet 42 and a rear cabinet 43, as shown in FIG. 1. The liquid crystal module 41 of the liquid crystal display portion 40 is mounted on the liquid crystal display portion support member 2 by fastening screws 60 to screw mounting holes (not shown) through the screw receiving holes 2c of the liquid crystal display portion support member 2. The rear cabinet 43 is provided with a notch 43a for receiving the liquid crystal display portion support member 2.

The base 50 includes a base body 51, a cover member 52 and support legs 53, as shown in FIGS. 1 to 3. The base support members 3 are mounted on the base body 51 of the base 50 by fastening screws 61 to the screw mounting holes 3d of the base support members 3 through screw receiving holes (not shown) of the base body 51 from the side of the bottom surface. The cover member 52 of the base 50 is mounted on the base body 51 by fastening screws (not shown) to screw mounting holes (not shown) of the cover member 52 through screw receiving holes 51a of the base body 51 from the side of the bottom surface. The cover member 52 is provided with a notch 52a for receiving the liquid crystal display portion support member 2. The support legs 53 are mounted on the bottom surface of the base body 51.

The rotating operations of the display support mechanism 1 according to the first embodiment are now described with reference to FIGS. 1 and 10 to 12.

Figure 11:
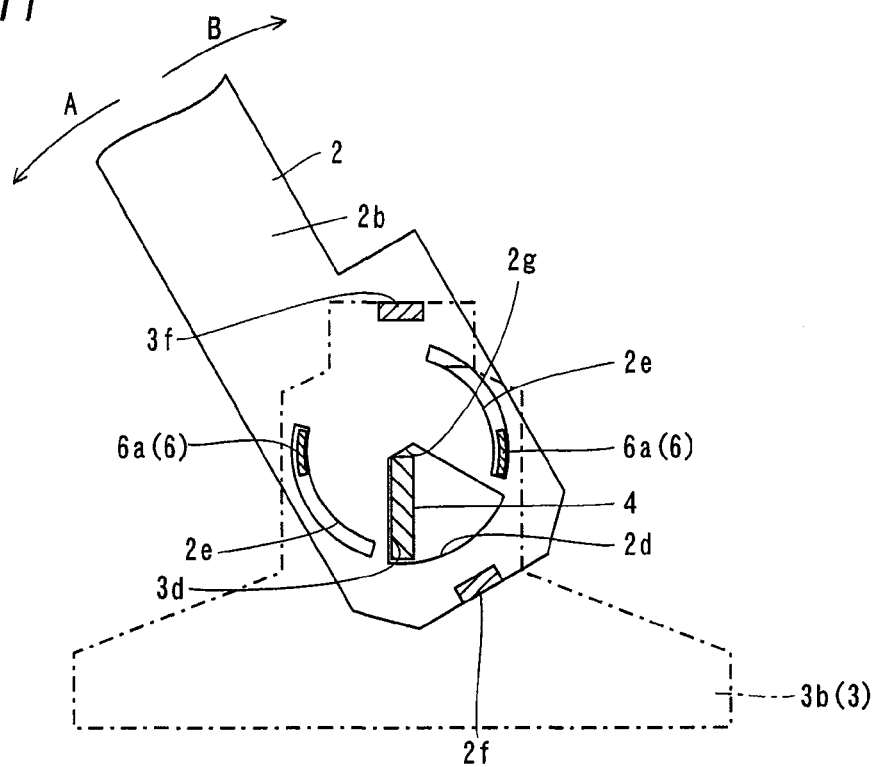
FIGS. 11 and 12 are sectional views for illustrating rotating operations of the display support mechanism according to the first embodiment shown in FIG. 3.

In order to incline the liquid crystal display portion support member 2 frontward, the liquid crystal display portion 40 (see FIG. 1) supported by the liquid crystal display portion support member 2 is grasped and pressed in the direction A from the state upright with respect to the base support members 3 as shown in FIG. 10. Thus, the liquid crystal display portion support member 2 is rotated in the direction A about the bottom portion 2g of each sectoral hole 2d, as shown in FIG. 11. The liquid crystal display portion support member 2 is pressed and rotated in the direction A up to a prescribed angle of inclination, to be supported at this angle of inclination with respect to the base support members 3 due to the frictional force between the projecting portions 2f and the base support members 3 and between the projecting portions 3f and the liquid crystal display portion support member 2. According to the first embodiment, the liquid crystal display portion support member 2 is rotatable (inclinable) up to an angle of inclination of 30° in the direction A so that each support shaft 4 comes into contact with a first end surface of the corresponding sectoral hole 2d, as shown in FIG. 11.

Figure 12:
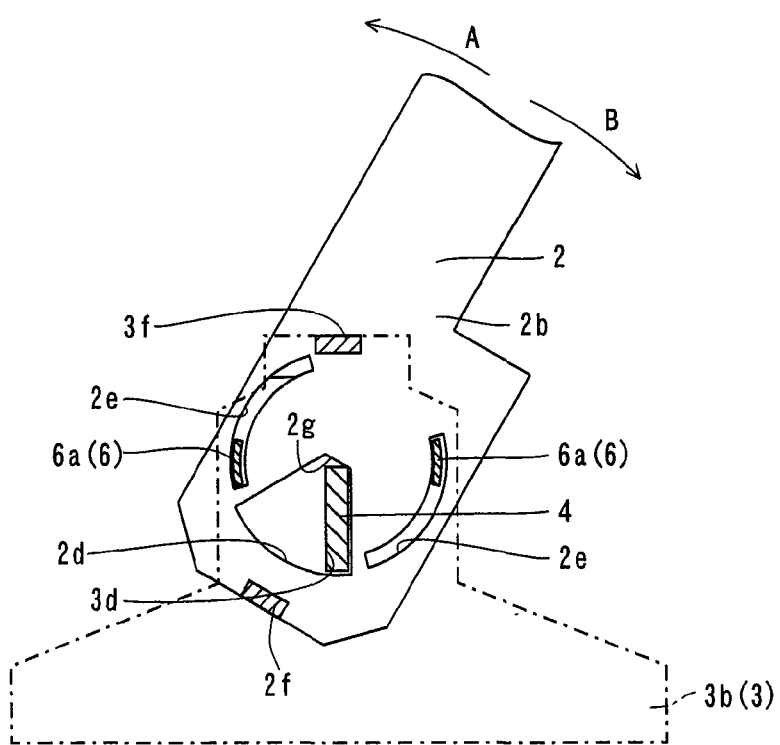

In order to incline the liquid crystal display portion support member 2 backward, on the other hand, the liquid crystal display portion 40 (see FIG. 1) supported by the liquid crystal display portion support member 2 is grasped and pressed in the direction B from the state upright with respect to the base support members 3 as shown in FIG. 10. Thus, the liquid crystal display portion support member 2 is rotated in the direction B about the bottom portion 2g of each sectoral hole 2d, as shown in FIG. 12. The liquid crystal display portion support member 2 is pressed and rotated in the direction B up to a prescribed angle of inclination, to be supported at this angle of inclination with respect to the base support members 3 due to the frictional force between the projecting portions 2f and the base support members 3 and between the projecting portions 3f and the liquid crystal display portion support member 2. According to the first embodiment, the liquid crystal display portion support member 2 is rotatable (inclinable) up to an angle of inclination of 30° in the direction B so that each support shaft 4 comes into contact with a second end surface of the corresponding sectoral hole 2d, as shown in FIG. 12.

According to the first embodiment, as hereinabove described, the display support mechanism 1 is provided with the platelike support shafts 4 as well as the liquid crystal display portion support member 2, having the holes 2d receiving the platelike support shafts 4, rotatable about the platelike support shafts 4 serving as the axes of rotation and the base support members 3 having the holes 3d receiving the platelike support shafts 4, whereby the platelike support shafts 4 can be employed as the axes of rotation with no requirement for round shafts. In this case, the support shafts 4 of sheet metal provided in the form of plates are so easily borable or shapable by press working that no complicated working of the axes of rotation is required dissimilarly to a case of performing grooving or the like along the outer peripheral surfaces of round shafts. Further, the liquid crystal display portion support member 2 and the base support members 3 are provided with the projecting portions 2f and 3f brought into pressure contact with opposed surfaces for developing frictional resistance, whereby frictional force can be developed between the liquid crystal display portion support member 2 and the base support members 3 for inhibiting the liquid crystal display portion support member 2 from rotation with respect to the base support members 3. With this frictional force, the liquid crystal display portion support member 2 can be inhibited from rotating with respect to the base support members 3 by its own weight and stopped at an arbitrary angle of rotation. Therefore, the liquid crystal display portion support member 2 may not be fixed to a prescribed inclinatory position with respect to the base support members 3 through pins or the like, whereby the angle of the liquid crystal display portion 40 can be easily controlled.

According to the first embodiment, as hereinabove described, the projecting portions 2f and 3f of the liquid crystal display portion support member 2 and the base support members 3 are brought into pressure contact with the base support members 3 and the liquid crystal display portion support member 2 respectively while the liquid crystal display portion support member 2 and the base support members 3 are deflected by elastic deformation so that the projecting portions 2f and 3f can be pressed against the base support members 3 and the liquid crystal display portion support member 2 respectively, whereby the frictional force can be easily obtained. Therefore, the frictional force for inhibiting the liquid crystal display portion support member 2 from rotation can be obtained without providing other members such as plate springs.

According to the first embodiment, as hereinabove described, the projecting portions 2f and 3f provided on the liquid crystal display portion support member 2 and the base support members 3 respectively are so arranged as to hold the support shafts 4 therebetween so that frictional force can be applied to positions opposite to each other with respect to the support shafts 4 serving as the axes of rotation, whereby the frictional force as well as the operations for rotating the liquid crystal display portion support member 2 can be stabilized.

According to the first embodiment, as hereinabove described, the holes 2d receiving the platelike support shafts 4 are provided in the form of sectors while the liquid crystal display portion support member 2 is rendered rotatable about the platelike support shafts 4 serving as the axes of rotation in the sectoral angular range, whereby the sectoral holes 2d can regulate the rotatable angular range of the liquid crystal display portion support member 2 with no requirement for other members for regulating the range of rotation.

According to the first embodiment, as hereinabove described, the holes 2d are provided in the form of sectors while the holes 3d are provided in the form of rectangles for regulating rotation of the platelike support shafts 4 so that the platelike support shafts 4 remain unsliding with respect to the base support members 3, whereby the base support members 3 can be inhibited from abrasion resulting from sliding of the support shafts 4.

According to the first embodiment, as hereinabove described, the projecting portions 2f are provided in the vicinity of the lower ends of the rotational portions 2b of the liquid crystal display portion support member 2 while the projecting portions 3f are provided in the vicinity of the upper ends of the rotational portion mounting portions 3b of the base support members 3, so that the distances between the projecting portions 2f and 3f applying friction and the support shafts 4 serving as the axes of rotation can be increased. Thus, torque obtained by the projecting portions 2f and 3f for inhibiting the liquid crystal display portion support member 2 from rotating about the support shafts 4 can be increased.

According to the first embodiment, as hereinabove described, the projecting portions 2f and the base support members 3 as well as the projecting portions 3f and the liquid crystal display portion support member 2 are brought into pressure contact with each other through the grease 80 respectively, to be inhibited from abrasion resulting from friction due to the grease 80.

Second Embodiment

Referring to FIGS. 13 to 16, pressure-contact plates 106 are provided with pairs of projecting portions 106c in a display support mechanism 101 according to a second embodiment of the present invention, dissimilarly to the aforementioned first embodiment. Platelike support shafts 4 and stop members 5 of the display support mechanism 101 according to the second embodiment are similar in structure to those of the aforementioned first embodiment.

Figure 13:
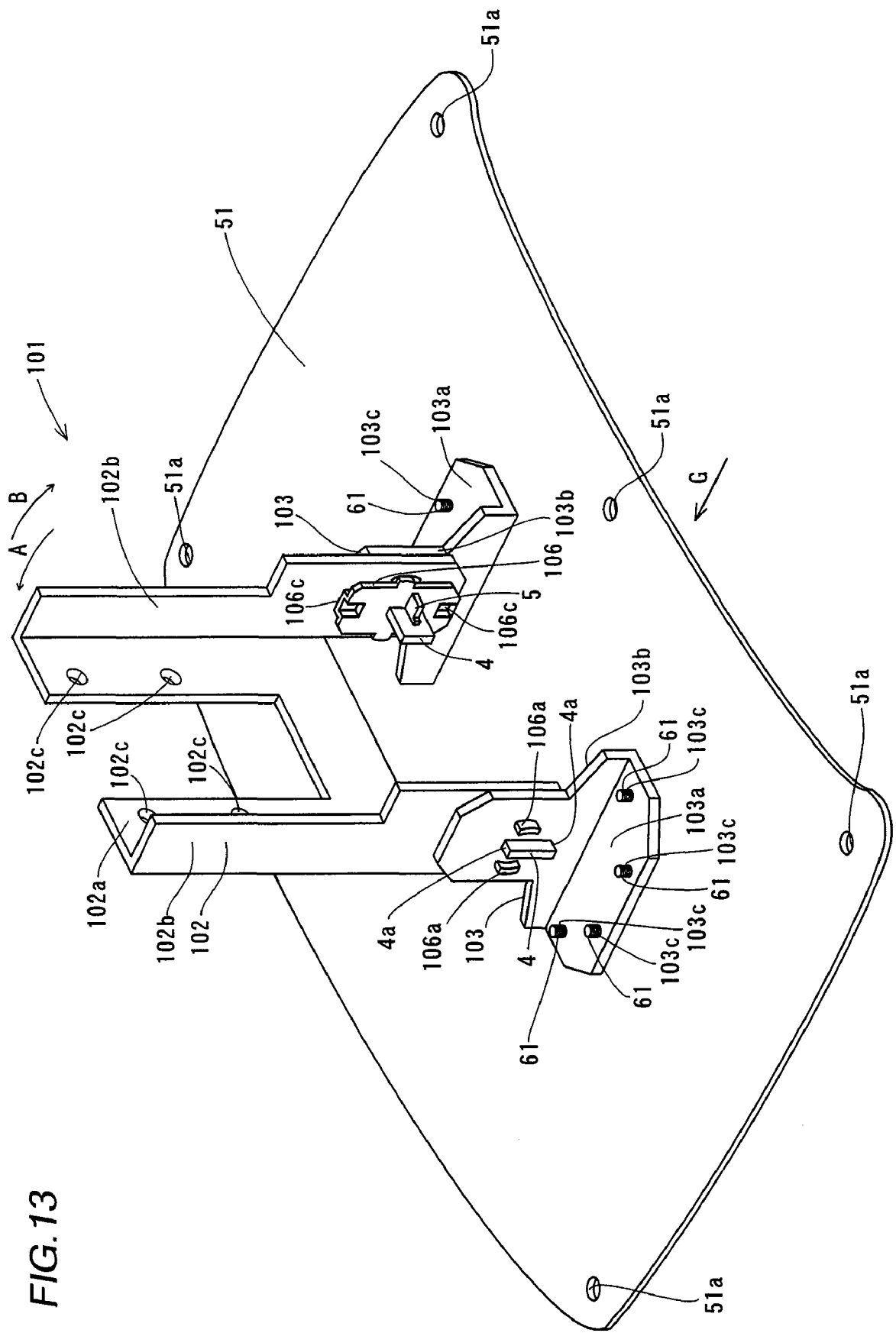
FIG. 13 is a perspective view showing the overall structure of a display support mechanism according to a second embodiment of the present invention.
Figure 14:
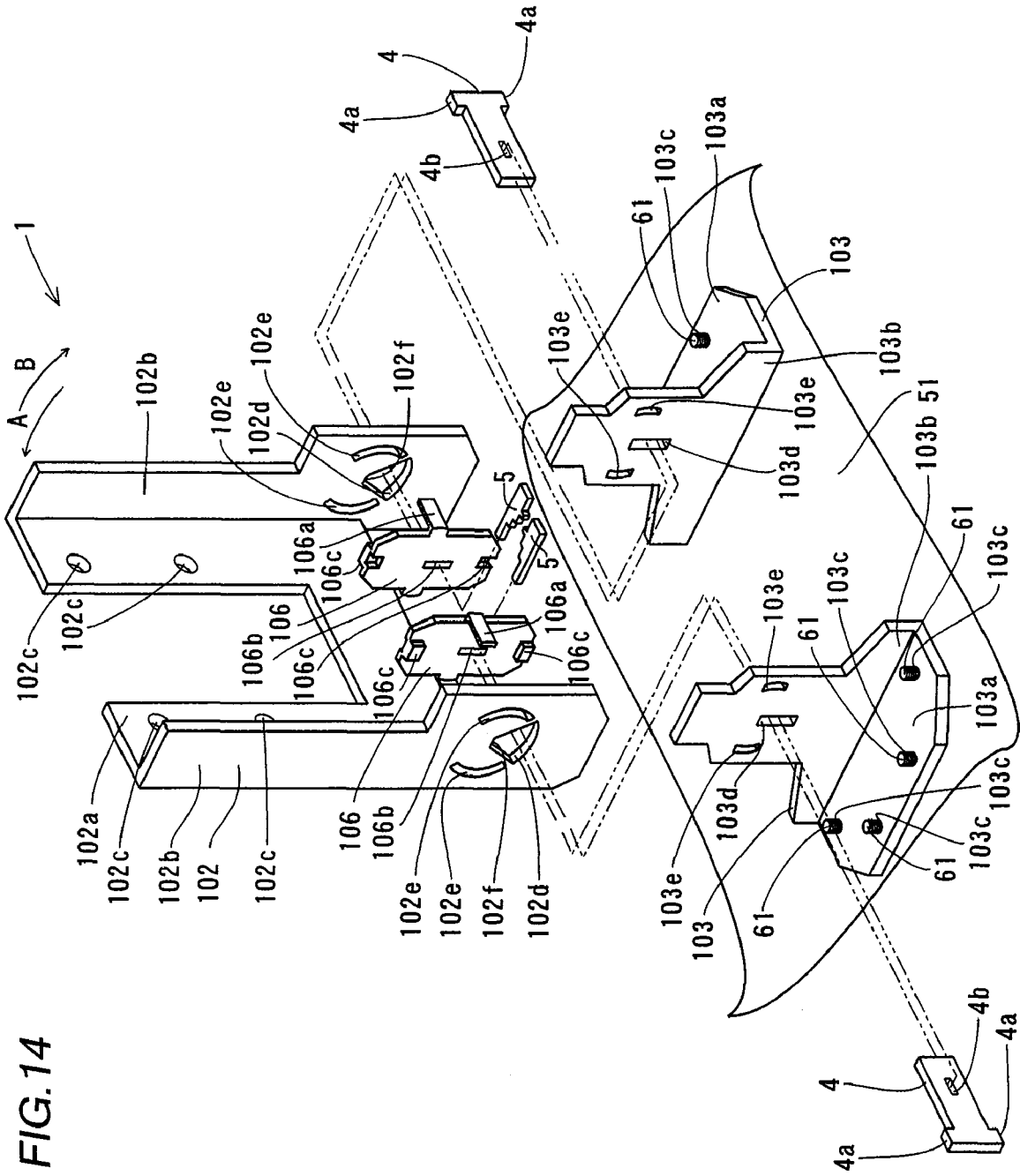
FIG. 14 is an exploded perspective view showing the overall structure of the display support mechanism according to the second embodiment shown in FIG. 13.

The display support mechanism 101 according to the second embodiment comprises a liquid crystal display portion support member 102, a pair of base support members 103, the platelike support shafts 4 of sheet metal, the stop members 5 of sheet metal and the pressure-contact plates 106 of spring steel, as shown in FIGS. 13 and 14. The liquid crystal display portion support member 102 is an example of the "display screen support member" in the present invention.

The liquid crystal display portion support member 102 includes a display portion mounting portion 102a and a pair of rotational portions 102b, as shown in FIG. 13. The display mounting portion 102a of the liquid crystal display portion support member 102 is provided with four screw receiving holes 102c. As shown in FIG. 14, sectoral holes 102d and pairs of arcuate holes 102e are provided in the vicinity of the lower ends of the pair of rotational portions 102b respectively. The liquid crystal display portion support member 102, supported by the platelike support shafts 4, is rendered rotatable in a sectoral angular range about bottom portions 102f of the sectoral holes 102d. In other words, the platelike support shafts 4 function as the axes of rotation of the liquid crystal display portion support member 102. The pairs of arcuate holes 102e are provided for receiving engaging sections 106a of the pressure-contact plates 106, as described later. The holes 102d are examples of the "first hole" in the present invention.

The pair of base support members 103 include base mounting portions 103a and rotational portion mounting portions 103b respectively, as shown in FIG. 13. The base mounting portion 103a of each base support member 103 is provided with four screw mounting holes 103c. The rotational portion mounting portions 103b are provided with rectangular holes 103d and arcuate holes 103e smaller in arcuate length than the pairs of arcuate holes 102e of the display mounting portions 102b of the liquid crystal display portion support member 102. The holes 103d are examples of the "second hole" in the present invention.

Figure 15:
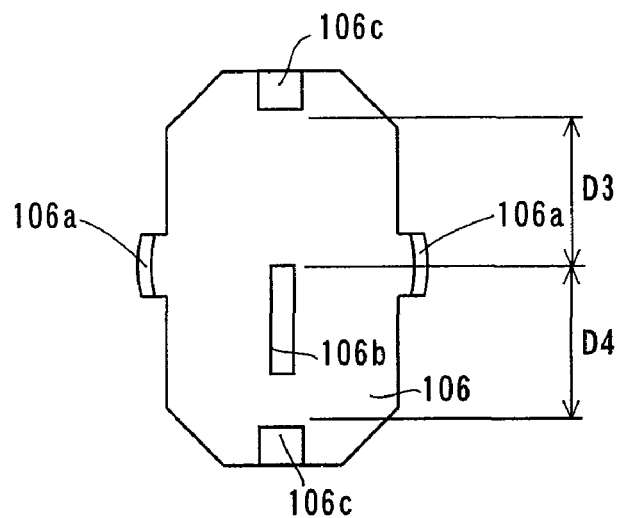
FIG. 15 is a plan view showing a pressure-contact plate of the display support mechanism according to the second embodiment shown in FIG. 13.

According to the second embodiment, each pressure-contact plate 106 of spring steel is longer in the vertical direction and provided with the pair of engaging sections 106a, a rectangular hole 106b and the pair of projecting portions 106c, as shown in FIGS. 14 and 15. The pair of engaging sections 106a engage with the holes 103e of the corresponding base support member 103 as shown in FIG. 14, thereby fixing the pressure-contact plate 106 to the corresponding base support member 103 with respect to the rotational direction of the liquid crystal display portion support member 102. The rectangular hole 106b receives the corresponding support shaft 4. The pressure-contact plates 106 are examples of the "plate member" in the present invention, and the holes 106b are examples of the "third hole" in the present invention.

Figure 16:
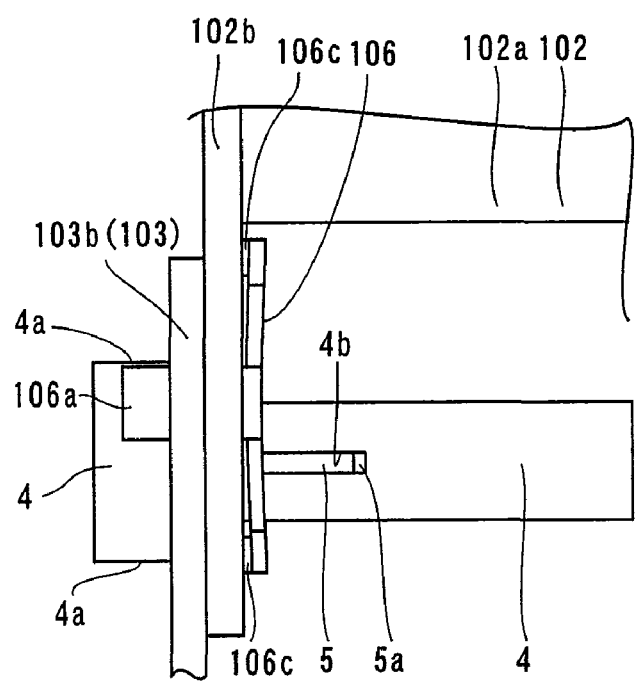
FIG. 16 partially illustrates the display support mechanism as viewed along arrow G in FIG. 13.

As shown in FIG. 16, the contact portion 4a of each support shaft 4 and the corresponding stop member 5 hold and press the liquid crystal display portion support member 102, the corresponding base support member 103 and the corresponding pressure-contact plate 106 therebetween.

According to the second embodiment, each pressure-contact plate 106 is pressed and deflected as shown in FIG. 16, to bring the pair of projecting portions 106c into pressure contact with the liquid crystal display portion support member 102 through restoring force. Further, the pressure-contact plate 106 is fixed to the corresponding base support member 103 with respect to the rotational direction of the liquid crystal display portion support member 102, whereby frictional force is applied between the liquid crystal display portion support member 102 and the projecting portion 106a of the pressure-contact plate 106 upon rotation of the liquid crystal display portion support member 102. With this frictional force, the liquid crystal display portion support member 102 can be inhibited from rotation. In addition, the pair of projecting portions 106c are so arranged as to hold the corresponding support shaft 4 therebetween. Therefore, frictional force can be applied to positions opposite to each other with respect to the support shaft 4 serving as the axis of rotation, whereby the frictional force as well as the rotating operations can be stabilized. The distance D3 between the upper projecting portion 106c of each pressure-contact plate 106 and the upper side (bottom portion 102f) of the corresponding support shaft 4 serving as the center of rotation and the distance D4 between the lower projecting portion 106c and the upper side (bottom portion 102f) of the corresponding support shaft 4 serving as the center of rotation are substantially equal to each other. Thus, the levels of the frictional force between the upper projecting portion 106c and the liquid crystal display portion support member 102 and between the lower projecting portion 106c and the liquid crystal display portion support member 102 can be approached to each other. Therefore, the rotating operations can be further stabilized.

According to the second embodiment, as hereinabove described, the display support mechanism 101 is provided with the platelike support shafts 4 as well as the liquid crystal display portion support member 102, having the holes 102d receiving the platelike support shafts 4, rotatable about the platelike support shafts 4 serving as the axes of rotation and the base support members 103 having the holes 103d receiving the platelike support shafts 4, whereby the platelike support shafts 4 can be employed as the axes of rotation with no requirement for round shafts, similarly to the aforementioned first embodiment. Further, the pressure-contact plates 106 are provided with the pairs of projecting portions 106c brought into pressure contact with the liquid crystal display portion support member 102 for developing frictional resistance, whereby frictional force can be developed between the pairs of projecting portions 106c of the pressure-contact plates 106 and the liquid crystal display portion support member 102 for inhibiting the liquid crystal display portion support member 102 from rotation with respect to the base support members 103. With this frictional force, the liquid crystal display portion support member 102 can be inhibited from rotating with respect to the base support members 103 by its own weight and stopped at an arbitrary angle of rotation. Therefore, the liquid crystal display portion support member 102 may not be fixed to a prescribed inclinatory position with respect to the base support members 103 through pins or the like, whereby the angle of a display screen (not shown) can be easily controlled.

According to the second embodiment, as hereinabove described, the pairs of projecting portions 106c are so arranged as to hold the support shafts 4 therebetween respectively so that frictional force can be applied to positions symmetrical with respect to the support shafts 4 serving as the axes of rotation, whereby the frictional force as well as the rotating operations of the liquid crystal display portion support member 102 can be stabilized.

Although the present invention has been described and illustrated in detail, it is clearly understood that the same is by way of illustration and example only and is not to be taken by way of limitation, the spirit and scope of the present invention being limited only by the terms of the appended claims.

For example, while the display support mechanism is provided on the liquid crystal display in each of the aforementioned first and second embodiments, the present invention is not restricted to this but the display support mechanism may alternatively be provided on a display such as an organic EL display other than the liquid crystal display.

While the holes of the base support members are provided in the form of rectangles, the holes of the liquid crystal display portion support member are provided in the form of sectors and the bottom portions of the sectors are located upward in each of the aforementioned first and second embodiments, the present invention is not restricted to this but the holes of the liquid crystal display portion support member may alternatively be provided in the form of rectangles, the holes of the base support members may alternatively be provided in the form of sectors, and the bottom portions of the sectors may alternatively be directed downward. When the liquid crystal display portion support member is rotated with respect to the base support members in this case, the support shafts inserted into the rectangular holes of the liquid crystal display portion support member are rotated about the bottom portions of the sectoral holes of the base support members integrally with the liquid crystal display portion support member.

Figure 17:
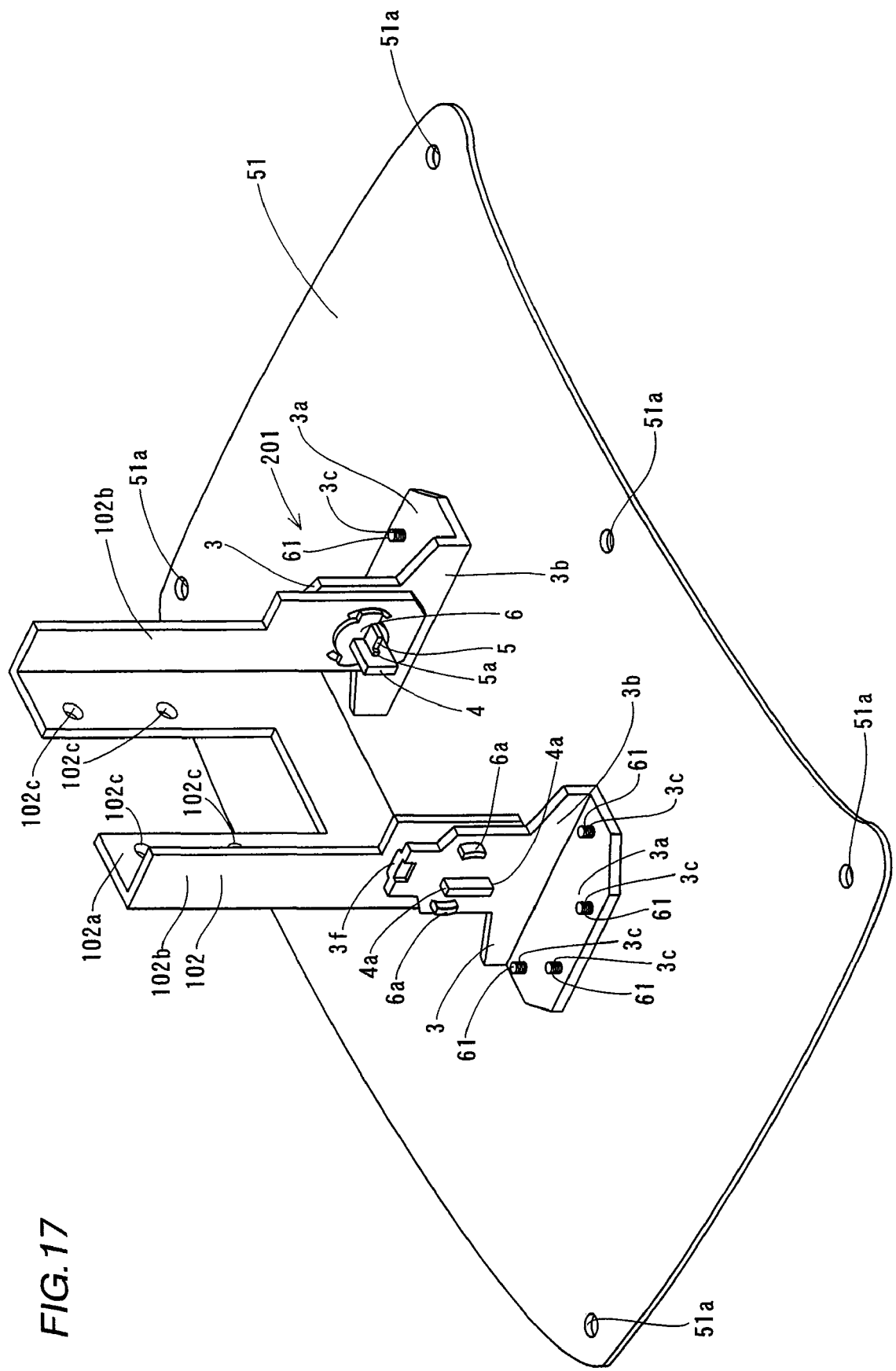
FIG. 17 is a perspective view showing the overall structure of a first modification of the display support mechanism according to the first embodiment of the present invention.
Figure 18:
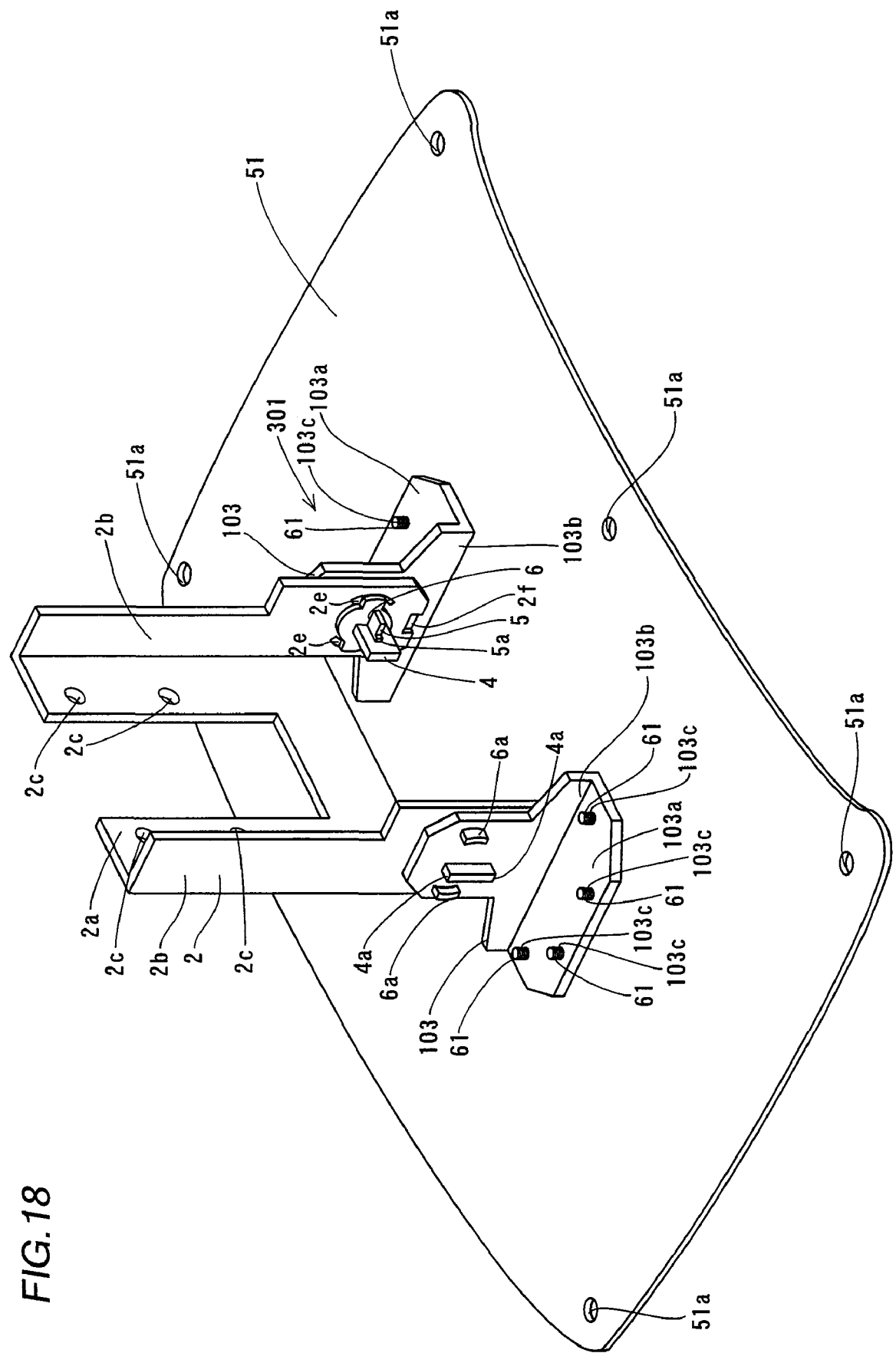
FIG. 18 is a perspective view showing the overall structure of a second modification of the display support mechanism according to the first embodiment of the present invention.

While both of the liquid crystal display portion support member and the base support members are provided with the projecting portions in the aforementioned first embodiment, the present invention is not restricted to this but only base support members 3 may be provided with projecting portions 3f as in a display support mechanism 201 according to a first modification of the first embodiment shown in FIG. 17. The display support mechanism 201 according to the first modification of the first embodiment can be easily formed by replacing the liquid crystal display portion support member 2 of the display support mechanism 1 according to the first embodiment with the liquid crystal display portion support member 102, provided with no projecting portions, of the display support mechanism 101 according to the second embodiment. Alternatively, only a liquid crystal display portion support member 2 may be provided with projecting portions 2f as in a display support mechanism 301 according to a second modification of the first embodiment shown in FIG. 18. The display support mechanism 301 according to the second modification of the first embodiment can be easily formed by replacing the base support members 3 of the display support mechanism 1 according to the first embodiment with the base support members 103, provided with no projecting portions, of the display support mechanism 101 according to the second embodiment.

While each of the rotational portions of the liquid crystal display portion support member and the base support members is provided with a single projecting portion in the aforementioned first embodiment, the present invention is not restricted to this but each of the rotational portions of the liquid crystal display portion support member and the base support members may alternatively be provided with a plurality of projecting portions.

What is claimed is:

1. A display support mechanism, comprising:
   a support shaft provided in the form of a plate;
   a display screen support member, having a first hole receiving said platelike support shaft, provided on a side of a display screen and rotatable about said support shaft serving as an axis of rotation; and
   a base support member, having a second hole receiving said platelike support shaft, provided on a side of a base, wherein
   at least either said display screen support member or said base support member is provided with a projecting portion brought into pressure contact with opposed surfaces of said display screen support member and said base support member for developing frictional; and
   said projecting portion provided on at least either said display screen support member or said base support member is brought into pressure contact with at least either said base support member or said display screen support member while at least either said display screen support member or said base support member is deflected by elastic deformation.

2. The display support mechanism according to claim 1, wherein
   said projecting portion includes a first projecting portion provided on said display screen support member and a second projecting portion provided on said base support member, and said first projecting portion of said display screen support member and said second projecting portion of said base support member are so arranged as to hold said support shaft therebetween.

3. The display support mechanism according to claim 2, wherein
said first projecting portion is provided in the vicinity of the lower end of said display screen support member, and
said second projecting portion is provided in the vicinity of the upper end of said base support member.

4. The display support mechanism according to claim 2, wherein
at least either said first hole or said second hole receiving said platelike support shaft is provided in the form of a sector while said display screen support member is rotatable about said platelike support shaft serving as an axis of rotation in the angular range of said sector.

5. The display support mechanism according to claim 1, wherein
either said first hole or said second hole is provided in the form of a sector while either said second hole or said first hole is provided in the form of a rectangle for regulating rotation of said platelike support shaft.

6. The display support mechanism according to claim 1, wherein
said projecting portion and at least either said display screen support member or said base member against which said projecting portion is pressed are brought into pressure contact with each other through grease.

7. The display support mechanism according to claim 1, wherein
said support shaft is made of sheet metal.

8. A display support mechanisms comprising:
a support shaft of sheet metal provided in the form of a plate;
a display screen support member, having a first hole receiving said platelike support shaft, provided on a side of a display screen and rotatable about said support shaft serving as an axis of rotation;
a base support member, having a second hole receiving said platelike support shaft, provided on and side of a base; and
a plate member having a third hole receiving said platelike support shaft, wherein
said plate member is provided with a projecting portion brought into pressure contact with at least either said display screen support member or said base support member for developing frictional resistance.

9. The display support mechanism according to claim 8, wherein
said projecting portion of said plate member includes a pair of projecting portions so arranged as to hold said platelike support shaft therebetween.

10. The display support mechanism according to claim 8, wherein
at least either said first hole or said second hole receiving said platelike support shaft is provided in the form of a sector while said display screen support member is rotatable about said platelike support shaft serving as an axis of rotation in the angular range of said sector.

11. The display support mechanism according to claim 9, wherein
either said first hole or said second hole is provided in the form of a sector while either said second hole or said first hole is provided in the form of a rectangle for regulating rotation of said platelike support shaft.

12. A display support mechanism, comprising:
a display screen support member provided on a side of a display screen;
a base support member provided on a side of a base; and
a support shaft provided in the form of a plate, wherein
said display screen support member has a first hole receiving said platelike support shaft and is rotatable about said support shaft serving as an axis of rotation,
said base support member has a second hole receiving said platelike support shaft,
said display screen support member and said base support member are provided with a first projecting portion and a second projecting portion brought into pressure contact with opposed surfaces of said base support member and said display screen support member respectively for developing frictional resistance,
said first projecting portion and said second projecting portion are so arranged as to hold said support shaft therebetween,
said first projecting portion of said display screen support member and said second projecting portion of said base support member are brought into pressure contact with said base support member and said display screen support member respectively while said display screen support member and said base support member are deflected by elastic deformation,
either said first hole or said second hole is provided in the form of a sector while either said second hole or said first hole is provided in the form of a rectangle for regulating rotation of said platelike support shaft, and
said display screen support member is rotatable about said platelike support shaft serving as an axis of rotation in the angular range of said sector.

13. The display support mechanism according to claim 12, wherein
said first projecting portion is provided in the vicinity of the lower end of said display screen support member, and
said second projecting portion is provided in the vicinity of the upper end of said base support member.

14. The display support mechanism according to claim 12, wherein
said projecting portions and at least either said display screen support member or said base member against which said projecting portions are pressed are brought into pressure contact with each other through grease.

15. The display support mechanism according to claim 12, wherein
said support shaft is made of sheet metal.

* * * * *